United States Patent [19]

Leiter et al.

[11] 4,343,613
[45] Aug. 10, 1982

[54] DERAILLER SYSTEM

[75] Inventors: Berndt Leiter, Hergolshausen; Josef Keller; Kurt Schuller, both of Schweinfurt; Ewald Eisend, Grafenrheinfeld, all of Fed. Rep. of Germany

[73] Assignee: Fichtel and Sachs AG, Schweinfurt, Fed. Rep. of Germany

[21] Appl. No.: 175,540

[22] Filed: Aug. 5, 1980

[30] Foreign Application Priority Data

Aug. 17, 1979 [DE] Fed. Rep. of Germany ....... 2933362

[51] Int. Cl.³ .............................................. F16H 7/22
[52] U.S. Cl. ........................................ 474/82; 474/80
[58] Field of Search .................................. 474/80, 82

[56] References Cited

U.S. PATENT DOCUMENTS

| | | | |
|---|---|---|---|
| 3,453,899 | 7/1969 | Tarutani et al. | 74/217 |
| 3,974,707 | 8/1976 | Nagano | 474/82 |
| 4,030,375 | 6/1977 | Nagano | 474/82 |

FOREIGN PATENT DOCUMENTS

296049  1/1972  Fed. Rep. of Germany .
 47985  5/1937  France .

Primary Examiner—Allan D. Herrmann
Attorney, Agent, or Firm—Toren, McGeady & Stanger

[57] ABSTRACT

A derailler system for a bicycle including a sprocket system having a plurality of drive sprockets and a chain for driving a wheel of the bicycle at different speeds with the chain being shifted onto individual drive sprockets by movement of an idler sprocket. A movable carrier member has the idler sprocket rotatably mounted thereon for selectively shifting the chain and a guide system is provided for guiding movement of the carrier member along the path essentially parallel with the axis of the driven wheel. A shifting mechanism for actuating the guide system includes a shift lever enabling shifting of the movable carrier to a plurality of shifting positions corresponding with the drive sprockets and a cam follower member including a cam follower rotatably mounted on a first part of the guide system is arranged to engage a cam member mounted on a second part of the guide system which is movable relative to the first part. The shift lever operates through a transmission mechanism to effect rotation of the cam member relative to the second part in order to move the guide sprocket to any one of a desired plurality of positions. A first spring is connected to urge the cam follower into contact with the cam member thereby to move the movable carrier member along its path of travel whenever the cam plate is rotated and a second spring biasing the cam follower member to a position relative to the first part is also provided with the relative position being defined by a stop member on the cam follower member and by a cooperating counterstop member on the first part of the guide system.

21 Claims, 7 Drawing Figures

DERAILLER SYSTEM

The present invention relates generally to derailler systems for bicycles or similar vehicles and more particularly to a system of the type consisting of a set of sprockets having a varying number of teeth arranged in side-by-side relationship in the direction of the axis of a bicycle wheel which is to be driven by the system with an idler sprocket being provided to enable shifting of a drive chain of the bicycle wheel driving system.

In devices of the type to which the present invention relates, the idler sprocket is mounted upon a movable carrier and is rotatable about an axis which is essentially parallel to the axis of the bicycle wheel to be driven. The movable carrier is movably guided along a path of motion which is essentially parallel with the axis of the bicycle wheel by means of a guide system which is operatively attached with the frame of the bicycle. A shift mechanism having transmission means operated by the shift lever acts to enable shifting of the movable carrier into various positions in accordance with the individual sprockets of the sprocket system. A cam follower is arranged on the first of two parts of the guide system which are movable relative to one another and the carriers, and on a second part of these two parts of the guide system a cam plate is rotatably mounted. The cam plate is rotatable by means of the shift lever through the transmission means relative to the second part. A first supplementary elastic guide means is provided in order to maintain the cam follower in constant contact with a cam surface of the cam plate and thereby to move the mobile carrier along its path of travel as soon as the cam plate is rotated.

A derailler system of the type to which the present invention relates is disclosed in U.S. patent application Ser. No. 61,065, filed July 26, 1979, now U.S. Pat. No. 4,273,546.

The present invention is directed toward the task of providing a derailler system of the type described wherein the operation of the system will be trouble free over an extended period of time, with the system being simple to operate and to adjust and requiring a minimum of maintenance.

It is significant that with the system of the present invention, preselection of a speed in both directions may be accomplished even at times when the chain does not run off the sprockets whereby it must be ascertained at the same time that the transmission means will always remain in a state of tension.

SUMMARY OF THE INVENTION

Briefly, the present invention may be described as a derailler system for a bicycle including a sprocket system having a plurality of drive sprockets and a chain for driving a wheel of the bicycle at different speeds comprising a movable carrier member having an idler sprocket rotatably mounted thereon for selectively shifting the chain into engagement individually with the sprockets, a guide system for guiding movement of the carrier member along a path essentially parallel with the axis of the driven wheel to urge the chain between individual sprockets, a shifting mechanism including a shift lever for enabling shifting of the movable carrier to a plurality of shifting positions corresponding with the drive sprockets, a cam follower member including a cam follower rotatably mounted on a first part of the guide system, a cam member rotatably mounted on a second part of the guide system which is movable relative to the first part thereof, transmission means for effecting rotation of the cam member relative to said second part by operation of the shift lever, first spring means connected to urge the cam follower into contact with the cam member thereby to move the movable carrier member along its path of travel whenever the cam plate is rotated, and second spring means biasing said cam follower member to a position relative to said first part, said relative position being defined by a stop member on the cam follower member and a cooperating counterstop member on said first part.

Thus, in accordance with the present invention, it will be seen that the cam follower is arranged on the cam follower member which is rotatably mounted on the first of the two movable parts of the guide system and which is spring biased relative to the first part by means of the second supplementary guide means in a position determined by a contact of the cam follower carrier and a counter contact of the first part.

The various features of novelty which characterize the invention, are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
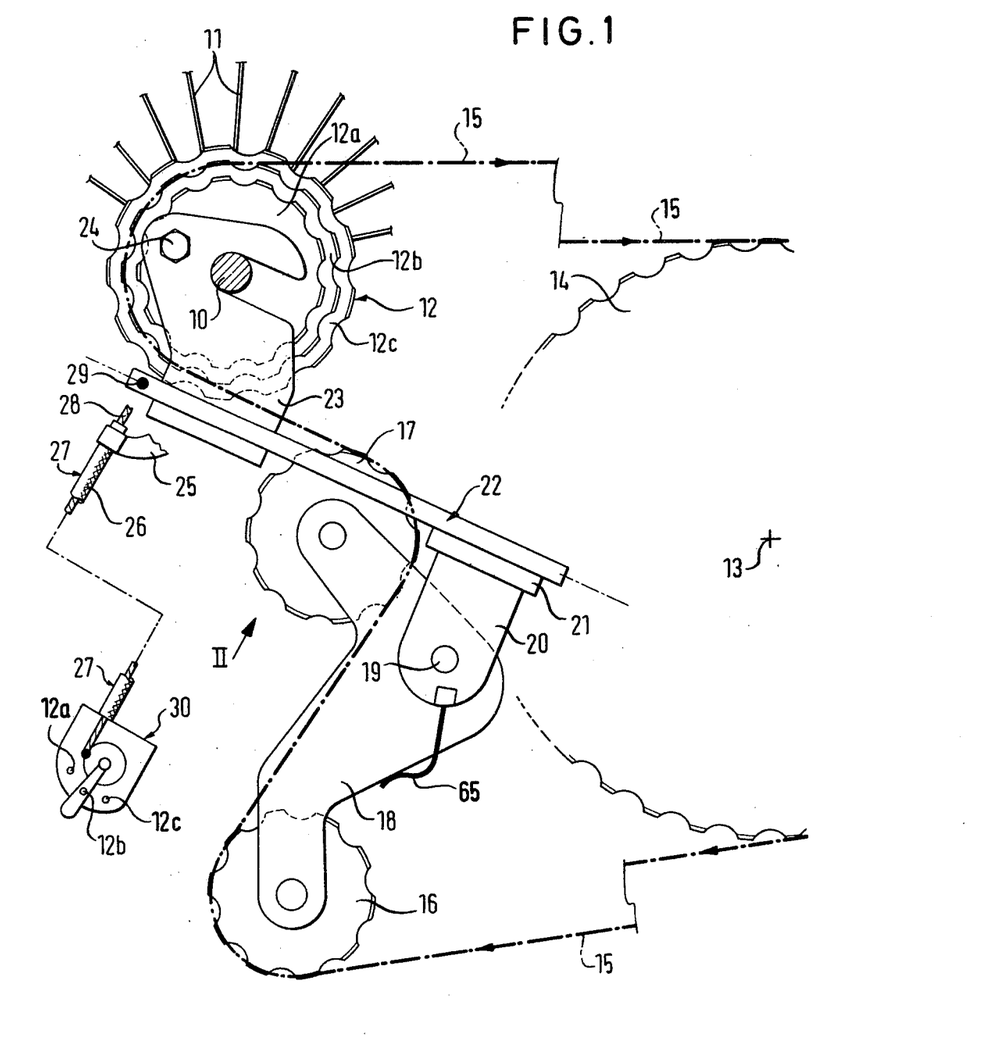
FIG. 1 is a schematic side view showing a derailler system in accordance with the invention.

Referring now to the drawings, wherein similar parts are identified with like reference characters throughout the various figures thereof, there is shown in FIG. 1 a derailler system in accordance with the invention which is operatively associated with the rear axle 10 of a bicycle wheel 11 represented by the spokes of the wheel. The rear wheel 11 is connected to a sprocket system 12 including a plurality of sprockets 12a–12c arranged concentrically with regard to the rear wheel and connected therewith in a torsionally static manner.

The system includes a conventional drive mechanism including a bicycle pedal bearing 13 upon which a drive sprocket 14 is rotatably mounted on one side of the pedal bearing.

A chain 15 extends from the sprocket 14 toward the sprockets of the sprocket system 12. The chain 15 extends over a tension pinion 16 and over an idler sprocket or wheel 17. The tension pinion 16 and the idler sprocket 17 are rotatably mounted upon a twin-arm tension lever 18 which is arranged under the influence of a tension spring 65. The tension lever 18 is mounted upon a lug 20 and rotatably connected thereto by a swiveling axle 19.

The system of the invention includes a movable carrier member 21 which is mounted upon a guide system 22 arranged in a plane perpendicular to the plane of the drawing and movably guided in a plane perpendicular to the plane of FIG. 1. The guide system 22 is mounted upon a rigid carrier 23 which is fastened on the rear axle 10 and which is additionally attached to the bicycle frame by means of a screw 24. An arm 25 abuts with a sheath 26 of a Bowden wire 27 which acts upon the guide system 22 at a point 29. The Bowden wire 27 emanates from a shift lever 30 and by means of the wire 27 the guide system 22 may be moved through operation of the shift lever 30 in such a way that the movable carrier 21 will be shifted in a direction which is essentially perpendicular to the plane of the drawing of FIG. 1. As a result, the idler sprocket 17 will be shifted in a direction along the rear axle 10 by the movable carrier 21.

Shifting of the idler sprockets 17 along the rear axle 10 will cause transfer of the chain 15 between the individual sprockets 12a-12c of the sprocket system 12. The chain 12 will always shift onto the sprocket which at any time is essentially located in a plane common with the plane of the idler sprocket 17 and extending parallel with the plane of the drawing of FIG. 1.

Figures 2, 3:
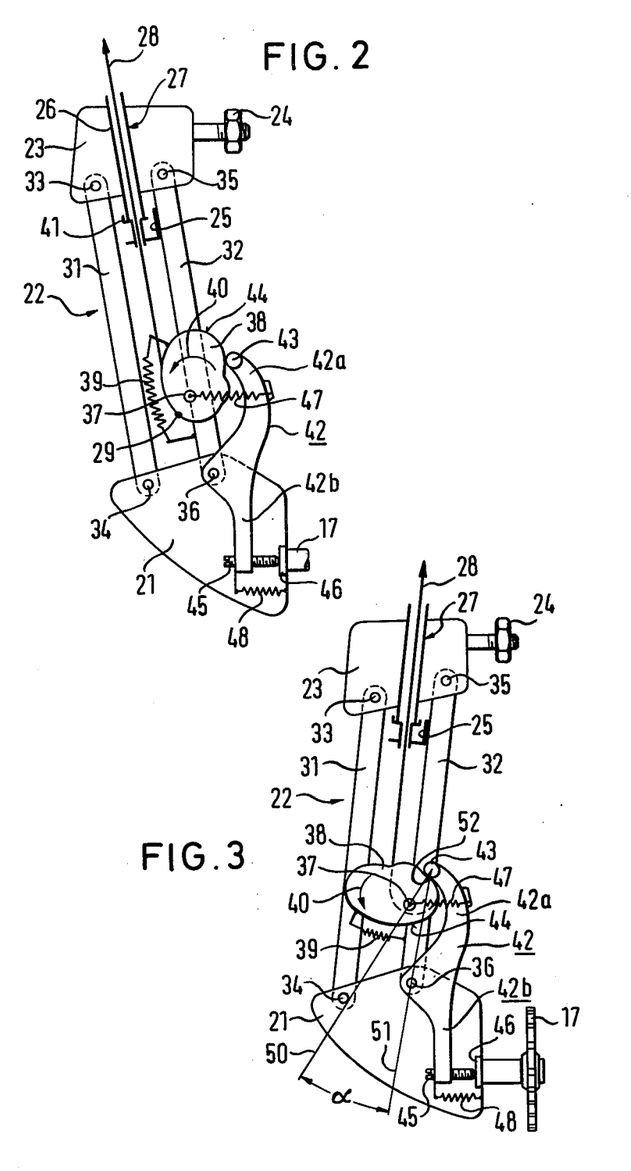
FIG. 2 is a schematic view of the derailler system of FIG. 1 taken in the direction of the arrow II.
FIG. 3 is a schematic view of the guide system shown in FIG. 2 depicted in a different shifting position.

The guide system of the invention is shown schematically in greater detail in FIGS. 2 and 3 and it will be seen that the system 22 is formed as a rectangular guide system in that the parts thereof approximate a parallelogram-type of guide mechanism. The parrallelogram-type guide system as shown includes the frame-mounted carrier 23, the movable carrier 21 and two connecting guide members 31 and 32. The guide member 31 is mounted at one end at a fulcrum 33 on the carrier 23 and at its opposite end on a fulcrum 34 on the carrier 21. The other connecting member 32 is mounted at one end on a fulcrum 35 on the carrier 23 and at its other end on a fulcrum 36 on the movable carrier 21.

A cam plate 38 is rotatably mounted on the connecting member 32 for rotation about a fulcrum 37. The cam plate 38 is tensioned or spring biased for rotation in the direction of the rotary arrow 40 by means of a biasing spring 39. The pull wire 28 of the Bowden wire 27 acts upon the cam plate 38. The point at which the pull wire 28 of the Bowden wire 27 is fastened to the cam plate 38 is the point 29, shown also in FIG. 1. The pull wire 28 will engage with the end thereof which is nearer the cam plate 38 part of the circumference of the cam plate 38. The sheath 26 of the Bowden wire will abut against the arm 25 upon which it is supported whereby the function of the arm corresponds with the arm 25 depicted in FIG. 1 and whereby said arm is fastened to the connecting guide member 32. The biasing of the Bowden wire sheath 26 against the arm 25 is effected by means of a Bowden wire adjusting screw 41 which is adjustable relative to the arm 25.

A cam follower carrier 42 is rotatably mounted on a fulcrum 36 which also connects the connecting guide member 32 and the movable carrier 21. The cam follower carrier 42 is designed as a twin-arm lever, with one arm 42a thereof carrying a cam follower 43. The cam follower 43 engages with a cam surface 44 of the cam member or plate 38. At the other arm 42b of the carrier 42 an adjustable stop member 45 is arranged formed in the shape of a threaded member. The adjustable stop or limit member 45, as shown in FIG. 2, engages a counterstop member 46 mounted upon the movable carrier 21.

A first supplementary guide spring 47 maintains the cam follower 43 in contact with the cam surface 44 of the cam plate 38. The follower 43 may, for example, be a rotatable roller mounted upon the arm 42a. The spring 47 acts between the connecting member 32 and the cam follower member 42 and as depicted in FIGS. 2 and 3 the spring 47 may be a helical tension spring or it could also be formed as a torsion spring.

A second tracking or guide spring 48 is engaged between the lever arm 42b of the cam follower carrier 42 and the movable carrier 21. The second spring 48 maintains the stop member 45 engaged with the counter stop member 46. Additionally, the second spring 48 as shown in FIGS. 2 and 3 may be a helical tension spring or it could also be a spring designed as a torsion spring.

Figure 4:
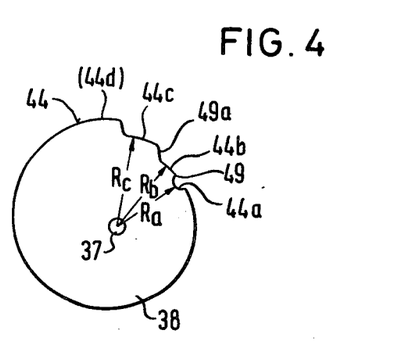
FIG. 4 is an enlarged representation of an embodiment of a cam member for the guide system of FIGS. 2 and 3.

As seen in FIG. 2, the wire 28 is extended in the direction of the arrow in a position which corresponds with a position of the shift lever 30 identified as position 12c as indicated in FIG. 1. Thus, the cam follower 43 will be engaged with a plateau 44c of the cam plate 39 as best seen in FIG. 4. As a result, the parallelogram-type guide system 22 will assume the position depicted in FIG. 2 whereby the movable carrier 21 will be in its position furthest toward the right as shown in FIG. 2. As a result, the idler sprocket 17 will lie in a plane coinciding with the plane of the largest sprocket 12c and the chain 15 will therefore run off onto the largest sprocket 12c.

Whenever the wire 28 is relaxed by movement of the shift lever 30 into a position such as the position 12b shown in FIG. 1, the spring 39 will pull the cam plate 38 in the direction of the rotary arrow 40 shown in FIG. 2 and the plate 38 will thereby rotate counterclockwise. As a result, the cam follower 43 will be moved into juxtaposition with a plateau 44b of the cam plate 38 which is radially recessed relative to the plateau 44c. If the chain 15 revolves during this shifting operation, it will be urged to shift from the sprocket 12c onto the sprocket 12b and the guide system 22, in accordance with FIG. 2, will move relative to the position shown in such a manner that the movable carrier 21 will be shifted toward the left. This movement is caused by the first tracking or guide spring 47 which moves the cam follower 43 toward the radially recessed plateau 44b.

However, if the chain is immobile during shifting of the shift lever 30 from position 12c to position 12b, then the chain 15 cannot simply shift from the large sprocket 12c onto the center sprocket 12b and as a result the guide system 22 will be temporarily blocked by the engagement of the idler sprocket 17 with the chain 15. Under this condition, the cam follower 43 cannot simply abut against the plateau 44b but will remain immobile at a distance relative to the plateau 44b and after the chain 15 has been again set in motion, the chain will skip or shift from the large sprocket 12c onto the center or medium-sized sprocket 12b, whereby the first guide spring 47 maintaining the cam follower in constant contact with the plateau 44b will cause the movable carrier 21 to shift toward the left.

If the wire 28 is further relaxed by movement of the shift lever 30 into a position 12a shown in FIG. 1, the cam plate 38 will be further rotated by the biasing spring 39 in a counterclockwise direction in accordance with the rotary arrow 40 shown in FIG. 2 so that the cam follower 43 will move into juxtaposition with the plateau or notch 44a of the cam plate 38. Whenever the chain 15 is in motion during a shifting operation, the follower 43 under the force exerted by the first spring 47 will be immediately pulled into the plateau 44a whereby the guide system will assume the position shown in FIG. 3.

However, if the chain is immobile during a shifting operation of the shift lever 30 from position 12b to position 12a, the guide system will be temporarily blocked in its central position (not shown) and the cam follower 43 will be maintained a distance from the cam plate 38 above the plateau 44a. Only after the chain 15 has been set again in motion and is thus capable of shifting from a center or medium-sized sprocket 12b onto the smaller sprocket 12a, will the guide system be released thus enabling the follower 43 under the influence of the spring 47 to drop into the plateau or notch 44a. Thus, the position of the guide system according to FIG. 3 will be attained and the idler sprocket 37 will then be approximately in a plane corresponding to the plane of the small sprocket 12a.

During the shifting operations described thus far, the limit stop 45 will always remain engaged with the counterstop 46 due to the effect of the second tension spring 48.

When the guide system 22 is reversed and moves to a central position from the shifting position depicted in FIG. 3 corresponding with the position of the shift lever at 12a, the wire 28 is pulled back from the position 12a to the position 12b by the swiveling motion of the shift lever 30, that is it is pulled in the direction of the arrow shown in FIG. 3. Thus, the cam plate 38 will be rotated against the biasing force of the spring 39 and will turn in a clockwise direction opposite the direction of the rotary arrow 40. The cam follower 43 is thereby pushed out of the notch 44a and moves onto the plateau 44b after first sliding over a transitional or intermediate flank 49. If the chain 15 is in motion during this shifting operation, the guide system 22 will immediately follow and it will be shifted from the position indicated in FIG. 3 in a direction toward the position indicated in FIG. 2 until it reaches a central position (not shown) which is determined by the plateau 44b.

If, however, the chain 15 is not in motion during the shifting operation described above, the guide system will, for a period of time, be incapable of moving toward the right from the position shown in FIG. 3 because it will be blocked by the idler sprocket 17 engaged in the chain 15. As a result, the cam follower 42 will be swiveled out of the position shown in FIG. 3 whereby the limit stop 45 will lift off the counterstop 46 against the biasing force of the second spring 48.

After the chain 15 has been set again in motion, it will be then capable of shifting from the small sprocket 12a onto the medium-sized sprocket 12b and the aforesaid blocking of the guide system 22 will cease and the system 22 will be moved out of the position shown in FIG. 3 into a central position (not shown) by the pulling force of the spring 48. The guide system will remain in this position until the stop 45 is again brought into contact with the counterstop 46. The idler sprocket 17 will then lie in a plane coincident with the plane of the center sprocket 12b and the chain may then run off over the medium-sized center sprocket 12b. The shifting operation from the central position (not shown) into the position of FIG. 2 by shifting of the lever 30 from the position 12b to the position 12c is effected in a similar manner as the shifting operation previously described from a position according to FIG. 3 into the central position whereby the cam follower 43 engages on the plateau 44c from the plateau 44b by traversing another intermediate transitory flank.

It should be noted that in all of the shifting positions described herein wherein the direction of the shift is not of significant importance, the wire 28 will never be slack. This is caused by the arrangement of the second tensioning spring 48 together with the limit stop 45 and the counterstop 46.

As will be seen from FIG. 4, the cam plate 38 is formed with the bottom land of the plateau 44a and the bottom land of the plateaus 44b and 44c having different radii $R_a$, $R_b$ and $R_c$ with $R_a$ being less than $R_b$ and with $R_b$ being less than $R_c$. Furthermore, as demonstrated in FIG. 4 the plateaus 44b and 44c are formed as arcs of circles at least along the major portion of their respective lengths which have radii $R_b$ and $R_c$, respectively, and which are arranged around the fulcrum 37. As a result, the guide system 22 is not moved whenever the cam follower is moving along one of the plateaus 44b or 44c without actually leaving said plateaus. This has the advantage that in case of any elongation of the wire 28 because of a continuous strain by the spring 39, the guide system will not be shifted or otherwise disturbed.

The design of the notch 44a which deviates from that of the designs of the plateaus 44b and 44c is related to a basic adjustment of the derailler system wherein, in order to enable this basic adjustment to be made, the shift lever is moved to position 12a thus allowing the cam follower 43 to drop into the notch 44a. By turning the Bowden wire set screw 41 it may then be ascertained that there is no tension remaining in the wire 28. Thereupon, the movable stop 45 opposite the cam follower carrier 42 is adjusted until the idler sprocket 17 is in the correct position relative to the smallest sprocket 12a, that is approximately in a plane defined by the sprocket 12a. Thereupon, the Bowden wire adjusting screw 41 is turned until the wire 28 is taut or is only very slightly tensioned. Upon termination of the adjusting process the idler sprocket 17 will have the correct position relative to the sprockets 12b and 12c if, in the course of the shifting operation, the shift lever is moved to the position 12b and 12c with the cam follower thus being brought into engagement with the plateaus 44b or 44c respectively.

As previously mentioned, a slight rotation of the cam plate 38 which might possibly occur as a consequence of elongation of the pull wire 28 will have no effect on the position of the guide system 22 and thus on the position of the idler wheel 17 relative to the sprockets 12b and 12c. Whenever the cam follower 43 engages in the notch 44a, there is not available a plateau which could be compared to the plateaus 44b and 44c. Instead, the cam follower 43 with its circumferential shape will fit exactly into the notch 44a. Because of the engagement of the cam follower 43 into the notch 44a, the position of the guide system will be unequivocally defined. If the pull wire 28 is elongated during prolonged service, the engagement of the cam follower 43 in the notch 44a will not be affected since the pretensioning spring 39 is largely in a relaxed state during adjustment of the cam follower 43 into the notch 44a so that the spring 39 cannot effect movement out of the notch 44b on the part of the cam follower 43. This is the reason why in the case of notch 44a, the formation of a plateau similar to plateaus 44b and 44c may be dispensed with and a notched shape may be selected instead which makes the aforementioned method of basic adjustment possible.

The representation of the cam plate in FIG. 4 is not exactly identical with the representation of the cam plate shown in FIGS. 2 and 3 because the cam plate in FIGS. 2 and 3 is depicted only schematically. In FIG. 4 there is shown a further plateau 44d which is needed in the 3-speed embodiment shown in FIGS. 1, 2 and 3 but which according to the design of the derailler system could also be used with a 4-speed transmission.

The embodiments of FIGS. 2 and 3 also have an advantage in that the cam follower 42 is rotatably mounted in the same fulcrum which also connects the connecting member 32 and the movable member 21. This results in more economical manufacturing of the device insofar as machining procedures and the requirements for providing single parts are concerned.

Also of importance is the fact that the radii $R_a$, $R_b$, and $R_c$ in the sequence mentioned become increasingly larger and the pretensioning spring 39 will tend to engage the cam plate at the location of the smallest radius $R_a$. Thus, the spring attempts to rotate the cam plate in the sense of an approximation of the cam follower 43 toward the smallest radius $R_a$ so that the tensile strength of the spring 39 may be relatively small and therefore relatively smaller shifting forces may be applied at the shift lever.

Furthermore, it should be noted that the cam follower member 42 rotates about its fulcrum 36 always in the same direction while the cam plate 38 is also rotating around its fulcrum 37 whenever it initiates a movement on the part of the cam follower member 42. In order to provide for this identical sense of rotary motion of the cam plate 38 around the fulcrum 37 and of the cam follower member 42 around the fulcrum 36 it is essential that the connecting lines 50 and 51 form an acute angle whereby the connecting line 50 is determined by the point of contact 52 of the cam follower 43 with the cam surface 44 and the fulcrum 37, and whereby the connecting line 51 is defined by the point of contact 52 and the fulcrum 36. Furthermore, movement in the identical direction by the cam plate 38 and the cam follower member 42 will cause a favorable motive cycle between the cam follower and the cam and thus the force necessary for shifting the guide system 22 will be maintained relatively low.

It will be seen in FIGS. 2 and 3 that the cam plate 38 attached to the connecting member 32 and the cam follower member 42 movably mounted on the movable member 21 have been moved in the immediate vicinity of the idler sprocket 17 so that any play which may be constantly present in the joints and which cannot be suppressed totally will have as little effect as possible on the positioning of the idler wheel 17.

Furthermore, it will be seen from FIGS. 2 and 3 that the connecting member 32 which carries the cam plate 38 is the connecting lever nearer to the idler sprocket so that the sensitive parts of the cam plate 38 and the cam follower member 42 are located in the immediate vicinity of the idler sprocket 17, that is in an area of the guide system which is neither visible nor accessible from the outside so that there is very little danger that these parts will be damaged.

As can be further seen from FIGS. 2 and 3, the adjustable limit stop 45 attaches to the lever arm 42b of the cam follower member 42 is easily accessible thereby permitting easier adjustment of the basic setting of the system by means of the adjustable limit stop 45.

Figure 5:
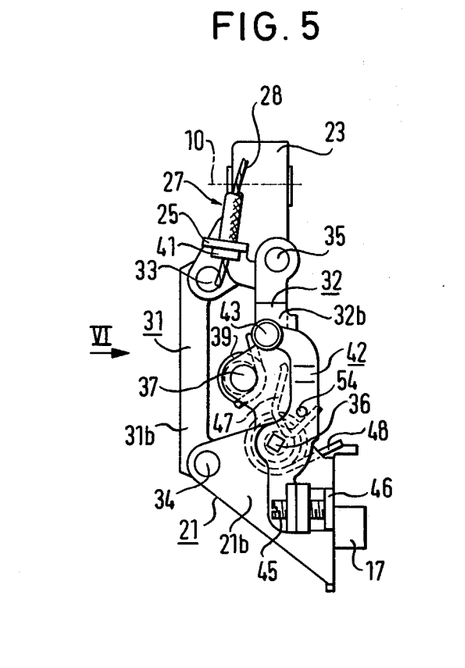
FIG. 5 is an engineering layout of a guide system of the type shown in FIGS. 2 and 3 taken in the direction of the arrow II in FIG. 1.
Figure 6:
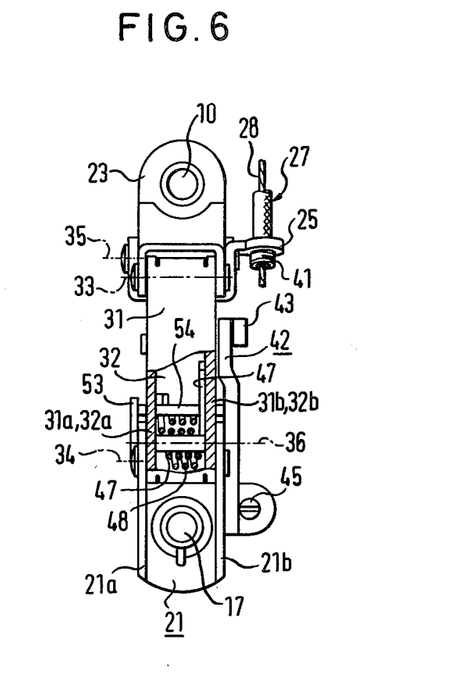
FIG. 6 is a view of the layout according to FIG. 5 taken in the direction of the arrow VI.

FIGS. 5 and 6 show the design of an embodiment of a guide system according to FIGS. 2 and 3 with identical parts being identified with the same reference characters in both sets of figures.

In the design according to the embodiment of FIGS. 5 and 6, the connecting levers 31 and 32 are formed with a U-shaped cross section whereby their cross-sectional configurations are positioned in such a way that the open ends of the U-shape lie opposite each other. Furthermore, as can be seen from FIG. 6, the movable part 21 is also formed with a U-shaped cross section. The legs 21a and 21b of the U-shaped configuration of the movable member 21 will abut against the other sides of the legs 31a and 31b of the movable connecting member 31 as well as against the legs 32a and 32b of the U-shaped configuration of the connecting member 32 whereby the legs of the latter member will be hidden from view in FIG. 6. In order to achieve a clearer arrangement, the cam plate 38 has been omitted in FIGS. 5 and 6. The cam follower carrier abuts at the outside of the leg 21b of the U-shaped configuration. The cam follower member 42 is secured against rotation by means of a pin 36 with the stabilizing lever 53. The pin 36 thereby extends through the legs 21a and 21b of the U-shaped configuration of the movable carrier 21 and also through the legs 32a and 32b of the U-shaped connecting member 32. In addition, the cam follower carrier 42 is connected to the stabilizing carrier 53 by means of a connecting pin 54. The first spring 47 and the second spring 48 are both designed as torsion springs enclosing the link pin 36. Thus, the first spring 47 is supported at one end by the connecting pin 44 and at the other end on the center leg of the connecting member 32 with the second spring 48 also abutting with one end against a connecting pin 54 and with its other end against the carrier 21. Because of the connection between the cam follower member 42 and the stabilizing lever 53, a further stabilization of the design is achieved wherein features having a high degree of stability as a result of the U-shaped profile of the connecting members 30, 32 and of the movable carrier 21 are achieved. Also, the spring 39, as indicated in FIGS. 5 and 6, is designed as a torsion spring which encloses the fulcrum 37.

The arrangement according to FIGS. 5 and 6 will also insure trouble-free power transmission of the forces of the spring.

Figure 7:
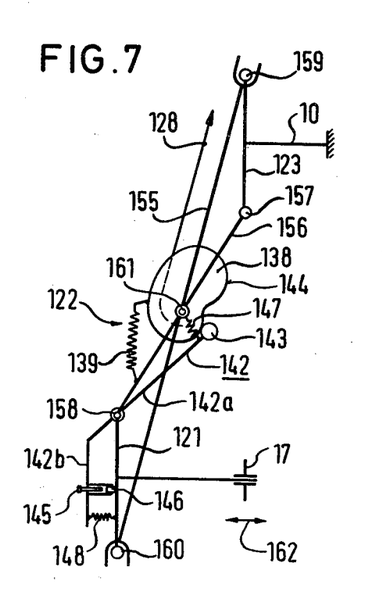
FIG. 7 is a schematic view of another embodiment of a guide system comprising an alternative to the guide system of FIGS. 2 and 3 again seen in the direction of the arrow II of FIG. 1.

FIG. 7 shows an embodiment which may be an alternative to the embodiment of FIGS. 2 and 3 wherein the parallelogram-type of guide system shown in FIGS. 2 and 3 is replaced with a different type of guide system. In FIG. 7, analogous parts with those shown in FIGS. 2 and 3 have been identified with similar reference numerals raised by a factor of 100.

In accordance with FIG. 7, the guide system 122 consists of a rigid carrier 123, a movable carrier 121 and two connecting members 155 and 156 arranged in cross wire position whereby the connecting member 155 is longer than the connecting member 156. The connecting member 156, in one fulcrum 157, is connected to the rigid carrier 123 and in another fulcrum 158 is connected to the movable carrier 121. The longer connecting guide member 155 is secured to a rigid carrier 123 by means of a slide joint 159 and to the movable carrier 121 by another slide joint 160. The two connecting members 155 and 156 are arranged crosswise and are connected to each other by means of a universal joint 161. The cam follower carrier 142 is rotatably mounted in the fulcrum 158. The lever arm 142a of the cam follower carrier 142 carries the cam follower 143 in abutment against the cam plate 138. The other lever arm 142b carries the adjustable limit stop 145. The five-joint guide system 122 of FIG. 7 allows displacement of the idler wheel 17 in the direction of the double arrow 162 according to FIG. 7. The tensioning spring 147 maintains the cam follower engaged with the cam 144 of the cam plate 138 and the second spring 148 keeps the adjustable stop limit 145 engaged with the counter stop 146.

Shifting operations of the embodiment shown in FIG. 7 are analogous and operate in a similar manner to the shifting operations involved in the embodiment according to FIGS. 2 and 3 and therefore similar procedures as those previously described will apply.

While specific embodiments of the invention have been shown and described in detail to illustrate the application of the inventive principles, it will be understood that the invention may be embodied otherwise without departing from such principles.

What is claimed is:

1. A derailling system for a bicycle including a sprocket system having a plurality of drive sprockets and a chain for driving a wheel of said bicycle at different speeds comprising: a movable carrier member having an idler sprocket rotatably mounted thereon for selectively shifting said chain into engagement individually with said sprockets; a guide system for guiding movement of said carrier member along a path essentially parallel with the axis of said driven wheel to urge the chain between individual sprockets; a shifting mechanism including a shift lever for enabling shifting of said movable carrier to a plurality of shifting positions corresponding with said drive sprockets; a cam follower member including a cam follower rotatably mounted on a first part of said guide system; a cam member mounted on a second part of said guide system, said first part and said second part of said guide system being movable relative to each other; transmission means for effecting rotation of said cam member relative to said second part by operation of said shift lever; first spring means connected to urge said cam follower into contact with said cam member thereby to move said movable carrier member along its path of travel whenever said cam member is rotated; and second spring means biasing said cam follower member to a position relative to said first part, said relative position being defined by a stop member on said cam follower member and a cooperating counterstop member on said first part.

2. A system according to claim 1 wherein said cam follower member is rotatably mounted about an axis which coincides with a common axis of rotation of said first part and of said second part.

3. A system according to claims 1 or 2 wherein said cam member is formed with a cam surface engaged by said cam follower which is shaped with a plurality of plateaus connected together by intermediate flanks extending therebetween with at least part of said plateaus extending in the shape of an arc of a circle around a fulcrum at which said cam member is rotatably mounted on said second part for at least a part of the length of said plateau, whereby the radius of said circle from said fulcrum differs from one plateau to another plateau.

4. A system according to claim 3 wherein said transmission means include a cable adapted to actuate said cam member for rotation relative to said second part, said system including third spring means spring biasing said cam member for rotation in a first direction toward a first extreme angular position thereof relative to said second part with said cam member being rotatively shifted against the action of said third spring means into a second extreme angular position by operation of said cable.

5. A system according to claim 4 wherein said first extreme angular position of said cam plate coincides with engagement of said cam follower with the one of said plateaus having the smallest radius from said fulcrum.

6. A system according to claim 5 wherein said plurality of sprockets include a sprocket having a smallest diameter and wherein said plateau having said smallest radius is engaged with said cam follower when said guide system is in a position at which said idler sprocket is located to lie approximately in a plane coinciding with the plane of said smallest-diameter sprocket.

7. A system according to claims 1 or 2 wherein the angle enclosed between a first line extending between the point of contact of said cam follower with said cam member and the fulcrum about which said cam member is rotatably mounted on said second part of said guide system and a second line extending between the point of contact of said cam follower with said cam member and a fulcrum pivotally mounting said cam follower member on said first part is less than 90° in all shifting positions of said system.

8. A system according to claim 7 wherein said angle is less than 60°.

9. A system according to claim 1 wherein said cam follower member is constructed as a twin-arm lever with said cam follower being mounted on one arm thereof and with said stop member being mounted on the other arm thereof.

10. A system according to claim 1 wherein at least one of said stop member and said counter stop member is adjustable.

11. A system according to claim 1 wherein said cam member is formed with a cam surface including a notch portion which may be engaged by said cam follower with said cam follower member in a position where said stop member may be held with said transmission means in a slack condition to allow adjustment of said guide system.

12. A system according to claim 11 wherein said cam member is rotatable between a first and a second terminal angular position and wherein said notch portion is located on a part of said cam surface coinciding with a position occupied by said cam follower member when said cam member is in said first terminal angular position.

13. A system according to claim 1 wherein said guide system is structured with said first part thereof being said movable carrier and with said second part thereof being a guide member having one end pivotally mounted relative to said movable carrier and with a second end pivotally mounted relative to a point fixed on said bicycle.

14. A system according to claim 1 wherein said guide system is formed as a parallelogram-type guide system having four guide members each pivotally mounted relative to two of the other of said guide members.

15. A system according to claim 14 wherein at least two of said four guide members extend generally parallel relative to each other.

16. A system according to claim 15 wherein said second part of said guide system having said cam member mounted thereon is one of said two parallel guide members.

17. A system according to claim 16 wherein said one of said two parallel guide members is located closer to said idler sprocket.

18. A system according to claims 13, 14, 15, 16 or 17 wherein said two generally parallel guide members are formed with a U-shaped cross-sectional configuration with the open sides of said U-shaped configuration pointing toward each other, wherein at least said movable carrier is also formed with a U-shaped cross-sectional configuration with the legs of the U-shaped configuration thereof abutting against the outer sides of the legs of the U-shaped configuration of said two parallel guide members, wherein said cam follower member is connected with a stabilizing lever by means of a connecting pin and secured against rotation relative thereto, wherein said first and said second spring means are formed as a primary and a secondary torsion spring, wherein said primary torsion spring has one end connected with said connecting pin and an opposite end connected with said one of said two parallel guide members having said cam member mounted thereon and wherein said secondary torsion spring has one end connected with said connecting pin and its other end connected with said movable carrier.

19. A system according to claim 13 wherein said guide system is formed with four guide members including a frame-mounted carrier affixed with said bicycle, said movable carrier, and two connecting guide members which are arranged to intersect each other with said intersecting connecting guide members being joined by a primary joint at their point of intersection, said two connecting guide members being connected with said frame-mounted carrier by means of a secondary and tertiary joint, said two connecting guide members being connected to said movable carrier by means of a fourth and a fifth joint, respectively, said system being formed so that two of said five joints are slide joints.

20. A system according to claim 19 wherein said cam member is rotatably mounted about said first joint and wherein said cam follower member is mounted on said movable carrier at a fulcrumed point.

21. A system according to claim 1 wherein said transmission means includes means for permitting said shift lever to be shifted to discrete positions and to be held thereat, said discrete positions corresponding with individual shifting positions of said derailler system.

* * * * *